United States Patent [19]

Terashima et al.

[11] Patent Number: 5,111,031
[45] Date of Patent: May 5, 1992

[54] OPTICAL CARD AND A RECORDING/REPRODUCTION APPARATUS FOR THE SAME

[75] Inventors: Shigeo Terashima, Tenri; Hirotsugu Matoba, Sakurai, both of Japan

[73] Assignee: Sharp Kabushiki Kaisha, Osaka, Japan

[21] Appl. No.: 346,804

[22] Filed: May 3, 1989

[30] Foreign Application Priority Data

May 7, 1988 [JP] Japan ................... 63-111289

[51] Int. Cl.⁵ .................................................. G11B 7/00
[52] U.S. Cl. ................................ 235/456; 235/495; 369/275.3; 369/275.4; 369/44.14
[58] Field of Search ................ 369/109, 275, 44.14, 369/44.37, 112, 100, 54, 56, 44.11, 32; 235/456, 454, 487, 494, 495

[56] References Cited

U.S. PATENT DOCUMENTS 4,779,154 10/1988 Lemelson .......................... 369/32
4,817,067 3/1989 Takahashi et al. ............... 369/44.26

FOREIGN PATENT DOCUMENTS 231009 1/1987 European Pat. Off. .
3717604 11/1987 Fed. Rep. of Germany .
55-34340 5/1980 Japan .
0216246 9/1986 Japan ............................. 369/109
0285785 11/1988 Japan ............................. 235/487

Primary Examiner—Roy N. Envall, Jr.
Assistant Examiner—Thang V. Tran

[57] ABSTRACT

An optical card comprising a memory region in which one pit train for supplying a track servo signal and a synchronizing signal is formed at a edge portion of the memory region. The optical card achieves increased storing capacity by including only one pit train. A recording/reproduction apparatus for the card comprises first and second optical heads. The first optical head scans the pit train to obtain the track servo signal and a synchronizing signal. The second optical head is used for recording and reproducing information from the optical card.

1 Claim, 5 Drawing Sheets

OPTICAL CARD AND A RECORDING/REPRODUCTION APPARATUS FOR THE SAME

BACKGROUND OF THE INVENTION

1. Field of the Invention

This invention relates to an optical card on which information can be recorded, and an apparatus for recording information on and/or reproducing information from the optical card.

2. Description of the prior art

An optical card has advantages in that over other memory devices in that it has a large memory capacity despite its small size, and be widely used in various information processing fields. Such optical cards include the read only type and the so-called write once type. In an optical card of the read only type, information is recorded during manufacturing prohibiting the additional recording of information on the card. By contrast, in an optical card of the write once type, information can be recorded once by the holder of the card. An optical card of the write once type will be described below to illustrate the prior art in contrast to the present invention.

A typical example of optical cards is shown in FIG. 5. The optical card 50 of FIG. 5 has a plate-like body 51, and a rectangular memory region 52 made of a magnetooptical material on which information can be optically recorded. FIG. 6 shows the structure of the memory region 52 in more detail. In the memory region 52, a plurality of guide tracks 61 are disposed in a parallel manner at fixed intervals. The guide tracks 61 are used in controlling a optical head of a recording and reproducing apparatus for the card which will be described below. Along each of the guide tracks 61, a pit train 62 is formed having a stripe portion (record track) 63 of fixed width between the guide track 61 and the pit train 62. Each pit train 62 consists of a plurality of circular pits 62a arranged in a row. Information is recorded as dot patterns 64 formed in the record tracks 63. The pit train 62 is used for obtaining synchronizing signals.

A recording and reproducing apparatus for the optical card 50 is shown in FIG. 4. When information is recorded on or reproduced from the optical card 50, the optical card 50 is inserted through a slot (not shown) of the apparatus of FIG. 4, and then immovably rests on a carrying means (not shown) which, as shown by bidirectional arrow A, is moved reciprocally by a card-carrying motor 41. An optical head 42 is movably disposed above the moving path of the optical card 50. As shown by bidirectional arrow B, the optical head 42 is reciprocally moved by a motor 43 in a direction perpendicular to the moving direction of the card 50.

When information is recorded on or reproduced from the card 50, the optical head 42 is moved so that it is positioned above the stripe portion 63 in which information is to be recorded or from which information is to be reproduced. While changing the relative positional relation between the optical card 50 and the optical head 42, a tracking signal is obtained from the guide track 61, and the synchronizing signal from the pit train 62. The fine adjustment of the light beam of the optical head 42 is conducted on the basis of the obtained tracking signal. The recording and reproduction of information is performed in accordance with the synchronizing signal.

In the prior art optical card 50, the guide track 61 and the pit train 62 must be formed for each record track 63. Namely, the memory region 52 contains the portions 61 and 62 which are useless in the storage of information, resulting in the prior art optical card having a reduced capacity for storing information.

SUMMARY OF THE INVENTION

The optical card of this invention, which overcomes the above-discussed and numerous other disadvantages and deficiencies of the prior art, includes a memory region for storing information having a first section and a second section in which information can be optically stored, said first section being juxtaposed to said second section, and a train of pits formed in said first section.

In a preferred embodiment, the memory region has a rectangular shape, and the train of pits is formed along one of the sides of said rectangular memory region.

In a preferred embodiment, the pits are arranged at predetermined intervals.

The recording and/or reproducing apparatus of this invention comprises a supporting means for supporting the above-mentioned card; an optical means; and a moving means for changing the relative positional relationship along a first direction between said supporting means and said optical means, said optical means having a first optical head for obtaining signals from said train of pits, a second optical head for recording information on and reproducing information from said second section, and another moving means for reciprocally moving said second optical head in a second direction perpendicular to said first direction.

In a preferred embodiment, the optical means further comprises an adjustment means for finely adjusting the optical operation of said second optical head.

In a preferred embodiment, a adjustment means adjusts a position of an object lens of said second optical head, in the direction perpendicular to said one direction and in the focusing direction.

In a preferred embodiment, the adjustment means operates on the basis of the signals obtained from said first optical head.

Thus, the invention described herein makes possible the objectives of:

(1) providing an optical card which has a large memory capacity;

(2) providing an optical card in which guide tracks are unnecessary;

(3) providing an optical card which requires only one pit train;

(4) providing an apparatus for recording information on and reproducing information from an optical card having a large memory capacity; and (5) providing an apparatus for reproducing information from an optical card having a large memory capacity.

DESCRIPTION OF THE PREFERRED EMBODIMENTS

Figure 3:
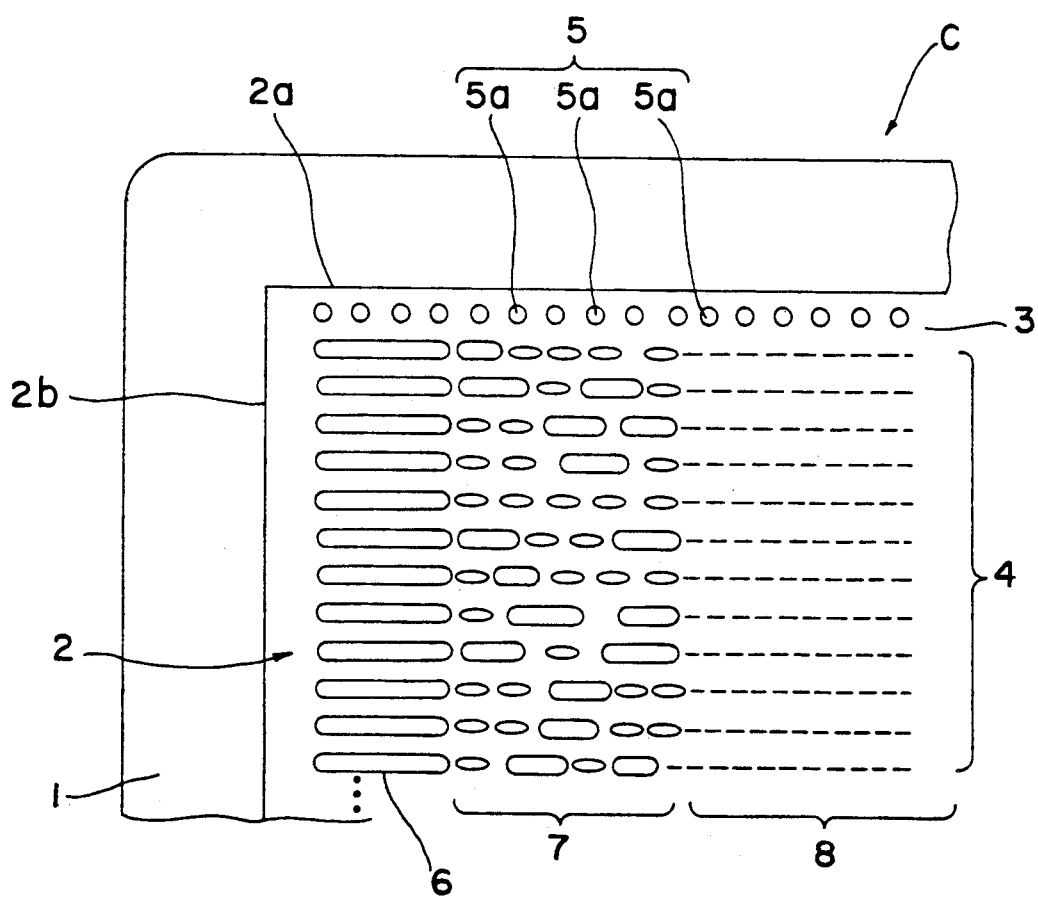
FIG. 3 illustrates the structure of an optical card according to the invention.
Figure 4:
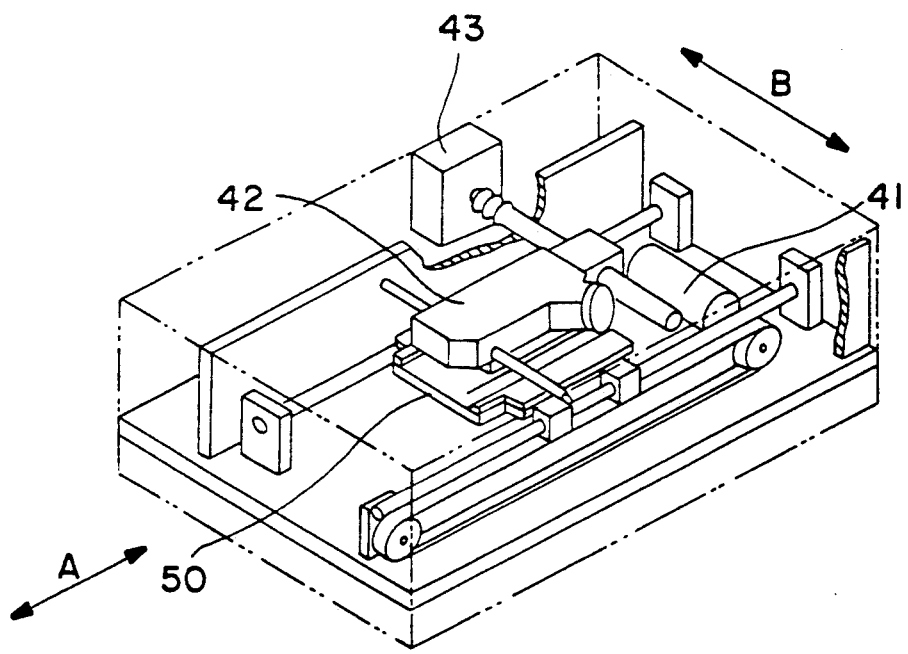
FIG. 4 is a perspective view illustrating the structure of a prior art recording and reproducing apparatus for an optical card.
Figure 5:
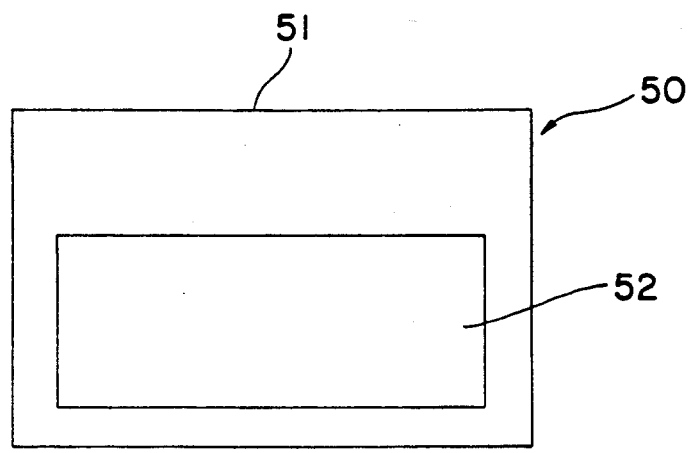
FIG. 5 shows a prior art optical card.
Figure 6:
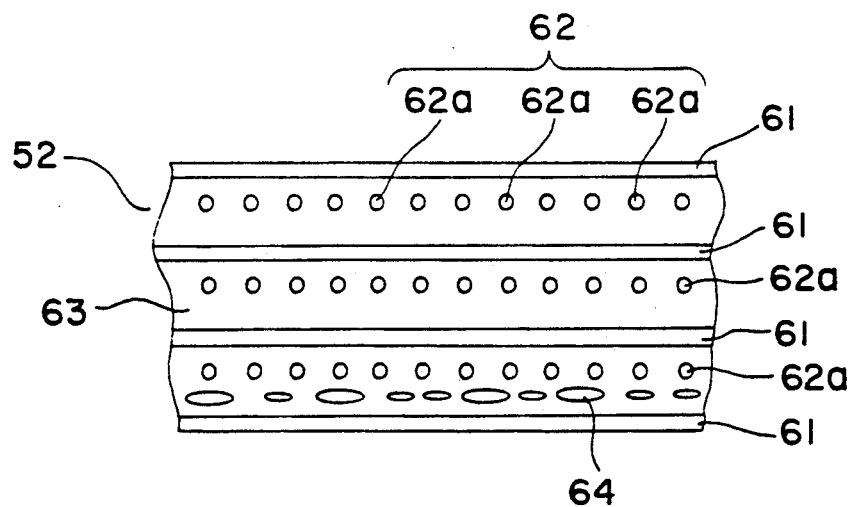
FIG. 6 illustrates the structure of the memory region of the optical card of FIG. 5.

FIG. 3 illustrates the structure of a preferred embodiment of an optical card according to the invention. The optical card C comprises a plate-like plastic body 1, and a rectangular memory region 2. In the optical card C, the memory region 2 has a first section 3 which extends along one side 2a of the memory region 2, and a second section 4 which occupies the portion of the region 2 other than the first section 3. A pit train 5 consisting of a plurality of circular pits 5a is formed in the first section 3. The pits 5a have a diameter of 2 to 5 μm and are arranged in a row at intervals of less than 10 μm.

In the second section 4, a plurality of tracks 8 in which information is to be stored are provided so that they extend in parallel with the pit train 5 at intervals of 2 to 5 μm. For each of the tracks 8, a long pit 6 and address pit portions 7 are formed between a second side 2b of the memory region 2 and the tracks 8. The long pits 6 are used for facilitating the track count control. Each of the address pit portions 7 indicates the address of the corresponding track 8. In the optical card C of FIG. 3, information can be stored in the area other than those used for the pit train 5, the long pits 6 and the address pit portions 7. Namely, the optical card C of FIG. 3 comprises a larger area for storing information when compared to prior art optical cards.

Figure 1:
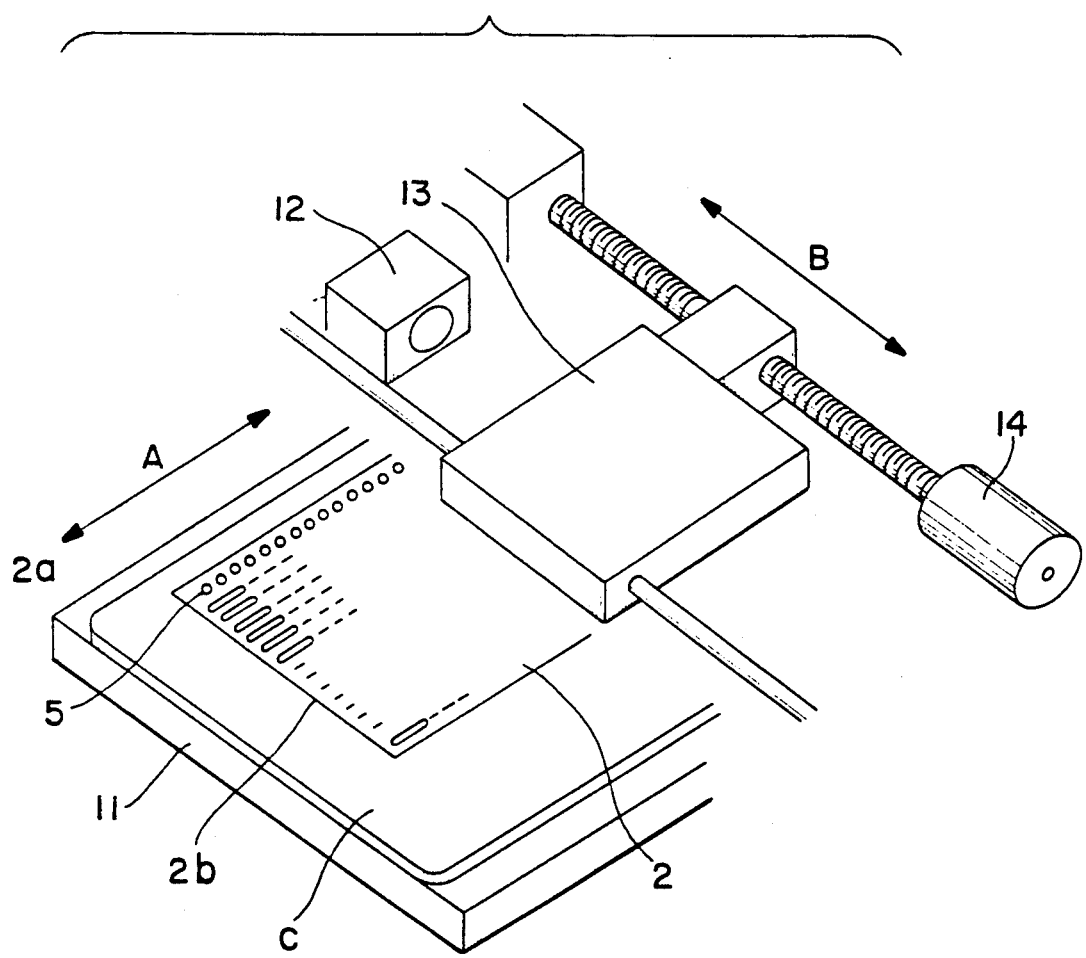
FIG. 1 is a perspective view diagrammatically illustrating an apparatus according to the invention.

FIG. 1 illustrates a recording and reproducing apparatus for the optical card of FIG. 3. The apparatus of FIG. 1 has a tray 11 on which the optical card C immovably rests. The tray 11 is driven by a driving means (not shown) for moving reciprocally the optical card C in directions indicated by the bidirectional arrow A. Above the moving path of the card C, is disposed an optical means D which comprises a first optical head 12 and a second optical head 13. The first optical head 12 is fixed to a pedestal (not shown) so that pits 5a of the pit train 5 of the card C move sequentially directly under the first optical head 12. The second optical head 13 is movably mounted on the pedestal. A stepping motor 14 is provided to move the second optical head 13 along the directions indicated by the bidirectional arrow B. The first optical head 12 scans the pit train 5. The second optical head 13 is moved by the stepping motor 14 to be positioned above one of the tracks 8 into which information is to be recorded or from which information is to be reproduced, and then scans the long pit 6 and the pit portion 7 to read the address of the track 8. Thereafter, the second optical head 13 conducts the process of recording or reproduction of information. Operation of the optical heads 12 and 13 will be described in more detail with reference to FIGS. 1 and 2.

Figure 2:
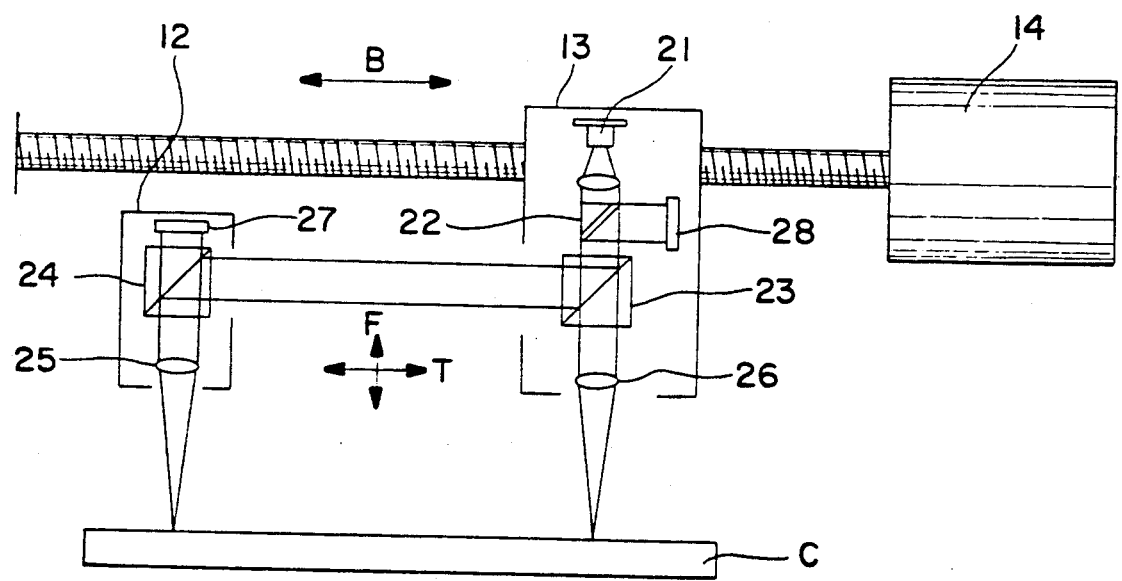
FIG. 2 is a side elevation view illustrating two optical heads of the apparatus of FIG. 1.

As shown in FIG. 2, the second optical head 13 comprises a semiconductor laser device 21, beam splitters 22 and 23, an object lens 26, and an optical detector 28. The first optical head 12 comprises a beam splitter 24, an object lens 25, and an optical detector 27. The light beam emitted from the laser device 21 is split so that one portion of the light beam is directed to the beam splitter 24 of the first optical head 12, thereby the laser beam is impinged on the pit train 5.

The light beam reflected from the pit train 5 enters through the splitter 24 into the detector 27 to be converted into an electric signal (control signal). In accordance with the control signal, the object lens 25 is controlled by a known control means (not shown) in the focusing direction F and the transverse direction T, thereby adequately focusing the laser spot of the optical head 12 on the pit train 5. The control signal is also supplied to a Control means (not shown) for the second optical head 13. In the control means for the second optical head 13, the control signal is used as a track servo signal to control the object lens 26 in the focusing direction F and the transverse direction T. The control signal is used also as a synchronizing signal, thereby controlling the recording and/or reproducing operation of the second optical head 13.

When information is to be reproduced from the optical card C, for example, the laser beam of the second optical head 13 which is controlled in accordance with the control signal scans the second section 4 of the card C. The light beam reflected from the second section 4 enters into the optical detector 28 through beam splitters 23 and 22, and is converted into an electric signal which will be processed to obtain information.

In the example described above, the laser device 21 is mounted in the second optical head 13. However, the laser device 21 may be mounted in the first optical head 12.

The present invention can be applied to a wide variety of optical cards irrespective of the structures of the pits and the material for the memory region.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical card provided with a rectangular memory region having a first edge and a second edge for storing information read by an optical reproducing apparatus during transportation of the optical card in a predetermined direction inside said optical reproducing apparatus, comprising:

a first train of pits formed along said first edge of said memory region extending parallel to said predetermined transportation direction of said optical card, wherein each pit has a predetermined length;

a plurality of track control pits, respectively positioned parallel to and extending from said first train of pits, wherein each of said track control pits being longer in length than said predetermined length of a pit from said first train of pits;

a plurality of address pits, each address pit extending from a corresponding track control pit, wherein said plurality of address pits includes pits of various lengths; and a plurality of linear tracks, each said linear track extending from a corresponding address pit, for storing information.

* * * * *